United States Patent [19]

Speigel

[11] 4,175,143
[45] Nov. 20, 1979

[54] COLOR CATHODE RAY TUBE PHOSPHORS COATED BY A WETTING AGENT

[75] Inventor: Kenneth Speigel, Seneca Falls, N.Y.

[73] Assignee: GTE Sylvania Incorporated, Stamford, Conn.

[21] Appl. No.: 49

[22] Filed: Jan. 2, 1979

[51] Int. Cl.$^2$ .............................................. B05D 5/12
[52] U.S. Cl. ..................................... 427/71; 427/220
[58] Field of Search .................... 96/36.1; 427/220, 68, 427/71

[56] References Cited

U.S. PATENT DOCUMENTS

| 3,025,161 | 3/1962 | Rychlewski | 96/36.1 |
|---|---|---|---|
| 3,402,065 | 9/1968 | McDondlad | 427/220 |
| 3,428,454 | 2/1969 | Angelucci | 96/36.1 |
| 3,440,077 | 4/1969 | Dapolito | 427/68 |
| 3,483,010 | 12/1969 | Glovatsky | 427/68 |
| 3,544,350 | 12/1970 | Viers | 96/36.1 |
| 3,753,710 | 8/1973 | Jones | 96/36.1 |

Primary Examiner—Sam Silverberg
Attorney, Agent, or Firm—William H. McNeill

[57] ABSTRACT

A process for increasing the wetting capabilities of phosphors employed in color cathode ray tubes includes coating the phosphors with a wetting agent which is organic, substantially non-ionic, water or alcohol soluble at 20° C. to 25° C., non-reactive with dichromate sensitized polyvinyl alcohol within the temperature range of about 20° C. to 480° C. and vaporizable at a temperature above about 60° C. and below 480° C. Use of the process reduces agglomeration of phosphor particles when used in dry phosphor screening techniques.

7 Claims, No Drawings

COLOR CATHODE RAY TUBE PHOSPHORS COATED BY A WETTING AGENT

TECHNICAL FIELD

This invention relates to color cathode ray tube phosphors and more particularly to a process for improving the wetting characteristics of such phosphors whereby sharper, more clearly defined elemental phosphor areas can be formed when fabricating screens for color tubes. Such improvements reduce agglomeration of the phosphors employed in the screen and thus increase brightness and improve color rendition by decreasing color dilution caused by uneven or ragged edges in the elemental phosphor areas.

BACKGROUND ART

The use of wetting agents in the deposition of phosphor screens is known in the art. These wetting agents, such as 1, 2 butanediol, have previously been incorporated into the sensitized photo resist upon which the dry phosphor powder is to be deposited. Additionally, materials such as silica and pyrophosphate have been coated upon the phosphor particles in order to make them free-flowing and reduce the possibility of particle agglomeration. While all of these techniques have been employed with some success, the agglomeration of the phosphor particle still exists.

DISCLOSURE OF THE INVENTION

The invention concerns a process for increasing the wetting capabilities of phosphors employed in color displaying cathode ray tubes. Such tubes have screens formed of a multiplicity of discrete phosphor triads emissive of light in the three primary colors; red, green and blue. The process is particularly applicable to screens formed by a dry deposition method such as that described in U.S. Pat. No. 3,025,161. In such a method a screen area is covered with a tacky photoresist and dry phosphors deposited thereon.

The process of the invention involves applying to the dry phosphor powders, before formation of the screen a coating of a wetting agent. The agent is disposed on the phosphors by dispensing them into a solution containing the wetting agent, mixing the phosphor and solution thoroughly, filtering the phosphor from the solution, drying the phosphor and breaking up any cake that forms.

Phosphors that do not wet thoroughly tend to agglomerate during the screening process. These agglomerated areas or clumps of phosphor particles are less bright under emission than are particles which are well wetted and evenly dispersed. Additionally, these agglomerations cause ragged edges of the elemental phosphor areas, usually dots or stripes, and cause a dilution of color and loss of definition when the tube is operated.

As noted above, previous attempts to cure these problems have included silicizing the phosphors and the incorporation of wetting agents into the photoresist; however, these prior attempts have not completely solved the problems.

The employment of the instant invention, however, has shown great promise in eliminating these deleterious effects.

BEST MODE FOR CARRYING OUT THE INVENTION

For a better understanding of the invention, together with other and further objects, advantages and capabilities thereof, reference is made to the following disclosure and appended claims.

Referring now to the invention with greater particularity, the wetting agents which can be advantageously employed with the instant process should be organic, substantially non-ionic (to avoid interference with the photoresist which is photo-polymerizable), water or alcohol soluble at 20° C. to 25° C., non-reactive with dichromate sensitized polyvinyl alcohol within the temperature range of about 20° C. to 480° C. and vaporizable at a temperature above about 60° C. and below 480° C.

The following non-limiting examples are exemplary of the process and materials.

EXAMPLE I

The following ingredients are combined in a vessel and mixed, as by stirring (all percentages in this and the following examples are by weight).
70.7% deionized water
0.7% alkyl phenyl ether of polyethylene glycol
28.6% phosphor particles (silicized)

Mixing is carried out for a sufficient period of time to insure coating of the phosphor particles (about 15 minutes.) After mixing, the solids are filtered out of the solution leaving a wet cake which is dried at about 55° C. for about 16 hours. The dried cake remaining is then broken up and the phosphor is ready for screening. (The alkyl phenyl ether of polyethylene glycol is available from Union Carbide Corporation under the tradename TERGITOL TP-9.)

EXAMPLE II

The following ingredients are combined in a vessel and mixed, as by stirring
70.7% methanol
0.7% polyethylene glycol
28.6% phosphor particles (silicized)

Mixing, filtering drying and break-up are carried out as above, except that drying time is about 1 hour. (Polyethylene glycol is available from the Union Carbide Corporation under the tradename CARBOWAX 4000).

EXAMPLE III

The following ingredients are mixed in a vessel and mixed, as by stirring
70.7% deionized water
0.7% polyethylene oxide
28.6% phosphor particles (silicized)

Mixing, filtering, drying and break-up are the same as Example I. (Polyethylene oxide is available from the Union Carbide Corporation under the tradename Polyox WSR N-10).

EXAMPLE IV 70.7% deionized water
0.7% alkyl aryl sulfonate (30% solution in $H_2O$)
28.6% phosphor particles (silicized)

Mixing, filtering, drying and break-up are the same as Example I. (The 30% solution of alkyl aryl sulfonate is available from DuPont Corporation under the tradename ALKANOL WXN).

EXAMPLE V 70.7% deionized water
0.7% sodium dodecyl benzene sulfonate (40% solution in $H_2O$)
28.6% phosphor particles (silicized)

Mixing, filtering, drying and break-up are the same as Example I. (The 40% solution of sodium dodecyl benzene sulfonate is available from Pilot Chemical Co. under the tradename Cal-Soft L-40). (alkyl aryl sulfonate and sodium dodecyl benzene sulfonate are two different names for essentially the same material).

EXAMPLE VI 71.25% deionized water
0.25% alkyl aryl sulfonate (solid at room temperature)
28.50% phosphor particles (silicized)

Mixing, filtering, drying and break-up are the same as Example I. (Solid alkyl aryl sulfonate is available from the DuPont Corporation under the tradename Alkanol XC).

EXAMPLE VII 71.25% deionized water
0.25% sodium dodecyl benzene sulfonate (solid at room temperature)
28.50% phosphor particles (silicized)

Mixing, filtering, drying and break-up are the same as Example I. (Solid sodium dodecyl benzene sulfonate is available from Pilot Chemical Co. under the tradename Cal-Soft F-90).

EXAMPLE VIII 1.7% deionized water
67.8% methanol
1.7% acetone
0.35% poly alkylene glycol ether (solid at room temperature)
28.45% phosphor particles (silicized)

Mixing, filtering, drying and break-up are the same as Example I. (Poly alkylene glycol ether is available from the Union Carbide Corporation under the tradename Tergitol XH).

All of the above materials, when employed in the process described have shown superior and unexpected improvements in the reduction of agglomerates.

While there have been shown what are at present considered to be the preferred embodiments of the invention, it will be apparent to those skilled in the art that various changes and modifications, such as small changes in the percentages, can be made herein without departing from the scope of the invention as defined by the appended claims.

I claim:

1. In a process for increasing the wetting capabilities of phosphors employed in color displaying cathode ray tubes, said tubes having screens formed of a multiplicity of discrete phosphor triads capable of emitting light in the primary colors, said screens having been formed by applying dry phosphor powders to a tacky photoresist, said process comprising the steps of: applying to said dry phosphor powders, before formation of said screens, a coating of a wetting agent selected from the group consisting essentially of alkyl aryl sulfonates, polyalkylene glycol ether, polyethylene oxide and polyethylene glycols so that said wetting agent is non reactive with dichromatic sensitized polyvinyl alcohol within the temperature range of about 20° C. to 480° C. and vaporizable at a temperature about about 60° C. and below 480° C.; by dispensing said dry phosphor powders into a solution containing said wetting agent; mixing said phosphor and solution thoroughly; filtering said phosphor from said solution to leave a wet phosphor cake; drying said wet phosphor cake; and breaking up said dried cake.

2. The process of claim 1 wherein said wetting agent is ethers of polyethylene glycol.

3. The process of claim 1 wherein said wetting agent is sodium dodecyl benzene sulfonate.

4. The process of claims 1, 2, or 3 wherein the drying temperature for said wet phosphor cake is about 55° C.

5. The process of claims 1, 2, 3, or 4 wherein said dry phosphor powders are silicized prior to the application of said wetting agent.

6. The process of claim 1 wherein said wetting agent is polyethylene glycol and the drying time is about 1 hour.

7. The process of claim 1 wherein said wetting agent is selected from the group consisting of polyethylene oxide, the alkyl phenyl ether of polyethylene glycol, alkyl aryl sulfonate, sodium dodecyl benzene sulfonate and polyalkylene glycol ether and the drying time for said cake is about 16 hours.

* * * * *